United States Patent Office 3,692,530
Patented Sept. 19, 1972

3,692,530
NEUTRALIZATION OF STRAW BY ADDING
POTATO PEELINGS
Robert P. Graham, Western Regional Research
Laboratory, El Cerrito, Calif. 94710
No Drawing. Filed Jan. 21, 1972, Ser. No. 219,834
Int. Cl. A23k 1/00, 1/23
U.S. Cl. 99—10
8 Claims

ABSTRACT OF THE DISCLOSURE

Animal feed prepared from agricultural wastes. Example: Straw is treated with steam under superatmospheric pressure and the product mixed with sufficient alkaline potato peelings to provide an essentially neutral feed material.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel processes for preparing animal feeds from agricultural wastes. More particularly, the invention is concerned with novel processes for enhancing the digestibility and nutritive value of straw, and for utilizing the waste from potato peeling operations. Further objects of the invention will be evident from the following description wherein parts and percentages are by weight unless otherwise specified.

In the following description, reference is made to the use of barley straw. This is by way of illustration and not limitation. In its broad ambit, the invention is applicable to straw of all kinds—for example, that derived from wheat, oats, barley, rice, corn, rye buckwheat, millet, sorghum, and to other cellulosic wastes such as sugar cane leaves, bagasse, and the like.

The production of grains necessarily yields large quantities of straw as a by-product of little value. Much of this straw is disposed of by burning, thereby creating a major atmospheric pollution problem. A small amount of straw is used as roughage for livestock. However, the low digestibility and nutritive value of straw limits its use as a feed. In general, ruminants will eat only a certain bulk weight of feed; that is, the animals cannot be forced to eat more of a feed that is less digestible. Accordingly, it would be desirable to enhance the digestability of straw. Thereby, a useful feed would be made available, and at the same time problems of atmospheric pollution would be reduced.

Prior hereto efforts have been made to beneficiate straw by treating it with steam under pressure. By such treatment cellullosic and other high molecular-weight components are degraded, with the result that its digestibility is increased. One of the factors in this technique, however, is that the product is strongly acidic. The breakdown of cellulosic materials results in formation of acidic substances, whereby the product has a pH of about 3 to 4. In order to provide a more neutral feed, it is necessary to incorporate therewith a basic material such as sodium hydroxide, sodium carbonate, or the like. Although such neutralization is effective, it is expensive so that the procedure is rendered economically unfeasible. Another problem is that although the steam treatment increases the digestibility of the straw, the product does not exhibit as high a digestibility as required for effective feeding.

A primary object of the invention is the provision of means for obviating the problems outlined above. In accordance with the invention, straw is treated with steam under superatmospheric pressure. The resulting acidic material is then neutralized with a particular material—alkaline potato peel—which is available in large quantities as a waste material in the processing of potatoes. The invention provides many advantages:

(1) It enables the desired neutralization to be carried out effectively, economically, and immediately.

(2) It enhances the nutritive value of the end product because the potato waste itself is rich in carbohydrates (especially gelatinized starch) and other nutrients.

(3) It serves to reduce the amount of waste which must be disposed of at potato processing plants.

(4) It decreases environmental pollution.

(5) It enables the product to be formed into pellets which retain their integrity during handling as in storage and shipping. This constitutes a significant advantage because ruminants will consume a greater amount of feed when it is in pellet form rather than in the form of random pieces or other natural forms.

With regard to the availability of the alkaline potato peel material used in accordance with the invention, the following explanation is provided: Recently, an improved method for peeling potatoes was developed by Robert P. Graham et al. and described in their U.S. Patents 3,517,-715 and 3,547,173. In this process—usually termed "dry caustic peeling"—potatoes are treated with lye, exposed to radiant heat, and the loosened peel then removed by dry brushing, that is, with no application of water, or with at most a minor amount of water. The primary advantage of the process is that the peel is obtained in a concentrated form, that is, as a solid or pasty mass, this being in sharp contrast to prior techniques wherein the peel waste is obtained as a dilute aqueous slurry. Another advantage of the patented process is that essentially all the sodium (from the lye applied to the potatoes) is retained in the peel material and therefore—in contrast to prior techniques—does not contaminate water effluents of the process.

The dry caustic peeling method in question is currently being used on a large scale in potato-growing areas (Idaho, for example). The peel material generally has a pH of about 12 and a solids content of about 15 to 20%. Although this waste consists largely of gelatinized starch, it cannot be directly used as a feed because of its high alkalinity. To remedy this situation, it has been advocated that the waste be subjected to fermentation or neutralized with a common acid such as sulphuric. Neither of these procedures are satisfactory. Fermentation gives rise to obnoxious odors; neutralization with an acid is too expensive.

DETAILED DESCRIPTION OF THE INVENTION

In a practice of the invention the straw to be treated is preferably first subdivided. This may be done in conventional manner such as by hammer-milling or by chopping. Typically, the straw is reduced to pieces having a length of about ½ to 6 inches.

The straw is then placed in a pressure vessel where it is treated with steam at superatmospheric pressure—usually about 100 to 1000 p.s.i.g. The desired result is achieved in a short time. Usually, an exposure to the steam for about 10 to 100 seconds is sufficient. The resulting product will generally have a pH of about 3 to 4. Whereas untreated straw has a low digestibility (about 30%, as measured by the TSAE method hereinafter disclosed), the steam-treated product has a digestibility of about 55 to 65%, depending on the pressure of steam and duration of the steam treatment.

The product of the aforesaid steam treatment is then mixed with the alkaline potato peel material, using enough of the latter so that the composite material is approximately neutral in pH. Usually, it is preferred to add sufficient of the potato peel material to provide a pH of about 8, whereby, on subsequent drying, the pH will decrease to neutrality (7).

The composite of steam-treated straw and potato peel material has a pleasant, molasses-like odor and a soft, doughy consistency. Its solids content is generally about 20% and it is useful as a feed without further processing. If desired, however, it may be dried so that it will not undergo fermentation during storage and transportation. Usually, it is preferred to pelletize the dried product. An advantage of the invention is that the composite material can be pelletized readily and the pellets retain their integrity during handling as in storage and shipping.

The products of the invention exhibit a digestibility as high as 80 to 85%. Such high levels of digestibility have not been realized by known procedures.

EXAMPLES

The invention is further demonstrated by the following illustrative examples.

Digestibility of the various materials was determined by an in vitro method known as the total-soluble-after-enzyme (TSAE) method. The results of this method closely approximate the values obtained from in vivo digestibility studies. The test is carried out as follows: A weighed sample of material is successively treated with cellulase and proteinase in a buffered aqueous medium. The residue left after these treatments is dried and weighed. The loss in weight is a measure of digestibility as it represents the cellulosic and proteinous substances solubilized by the enzymes and thus corresponds to the amount of these substances that would be digested by a ruminant ingesting the material under test.

Example 1

Barley straw was chopped into pieces about 4 inches long and the chopped straw was introduced into a pressure vessel where it was contacted with steam at 400 p.s.i.g. for 20 seconds. Additional lots of chopped straw were subjected to the same treatment with variation as to the time of steam treatment. The steam pressure was the same in each run—400 p.s.i.g. The products were assayed for digestibility as described above. Also, pH of the products was measured.

The results are summarized below.

| Sample | Time of steaming, sec. | pH of product | Digestibility of product, percent (dry basis) |
|---|---|---|---|
| Control | | 7 | 25 |
| 1 | 20 | 4.1 | 59 |
| 2 | 30 | 3.8 | 65 |
| 3 | 40 | 3.7 | 67 |
| 4 | 60 | 3.6 | 65 |
| 5 | 90 | 3.6 | 66 |

Example 2

The product from Example 1, Sample 3, was mixed with alkaline potato peelings in a proportion that yielded a mixture having a pH of 8. This required about 1.9 parts of the steamed straw product and one part of the alkaline potato peelings, on a dry weight basis. The solids content of the composite material was about 20%.

A portion of the composite material was dried and assayed for digestibility, which was found to be 85% on a dry weight basis. The pH of this product (on suspension in water) was 7.

Having thus described the invention, what is claimed is:

1. A process for preparing an animal feed which comprises—
    (a) contacting straw with steam under superatmospheric pressure, and
    (b) mixing the resulting steam-treated straw with alkaline potato peelings in an amount to form a mixture having an approximately neutral pH.

2. The process of claim 1 wherein, in step (a), the steam is at a pressure of about 100 to 1000 p.s.i.g.

3. The process of claim 1 wherein, in step (a), the contacting with steam is for a period of about 10 to 100 seconds.

4. The process of claim 1 wherein the product of step (a) has a pH of about 3 to 4.

5. The process of claim 1 wherein the alkaline potato peelings are a pasty material having a pH of about 12, and a solids content of about 15 to 20%.

6. A process for preparing an animal feed which comprises—
    (a) subdividing straw into small pieces,
    (b) contacting the pieces of straw with steam at a pressure of about 100 to 1000 p.s.i.g. for a period of about 10 to 100 seconds to produce steam-treated straw having a pH of about 3 to 4, and
    (c) mixing said steam-treated straw with alkaline potato peelings in an amount to furnish a mixture having a pH of about 7 to 8.

7. The process of claim 6 which includes the additional steps of drying the product of step (c) and pelletizing the so-formed dry product.

8. The process of claim 6 wherein the said alkaline potato peelings are a material having a solids content of about 15 to 20%, derived from the dry caustic peeling of potatoes.

References Cited

UNITED STATES PATENTS 2,940,858  6/1960  Flechsig _____ 99—9

FOREIGN PATENTS 762,648  9/1954  Great Britain _____ 99—8

NORMAN YUDKOFF, Primary Examiner

S. SILVERBERG, Assistant Examiner

U.S. Cl. X.R.

99—8, 149; 127—37

PO-1050
(5/69)

UNITED STATES PATENT OFFICE
CERTIFICATE OF CORRECTION

Patent No. 3,692,530          Dated September 19, 1972

Inventor(s) Robert P. Graham

It is certified that error appears in the above-identified patent and that said Letters Patent are hereby corrected as shown below:

The following statement should appear in the heading in col. 1:

Assignee: The United States of America, as represented by the

Secretary of Agriculture.

Signed and sealed this 2nd day of April 1974.

(SEAL)
Attest:

EDWARD M. FLETCHER, JR.
Attesting Officer

C. MARSHALL DANN
Commissioner of Patents